(No Model.)
G. J. W. GALSTER.
APPARATUS FOR CUTTING FORMS FROM A LAYER OR LAYERS OF FIBROUS OR OTHER MATERIAL.
No. 288,049. Patented Nov. 6, 1883.
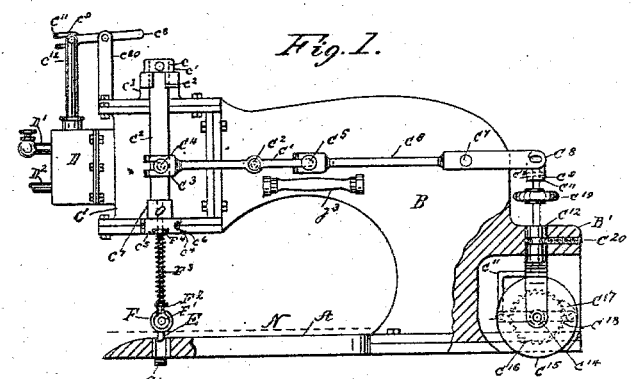
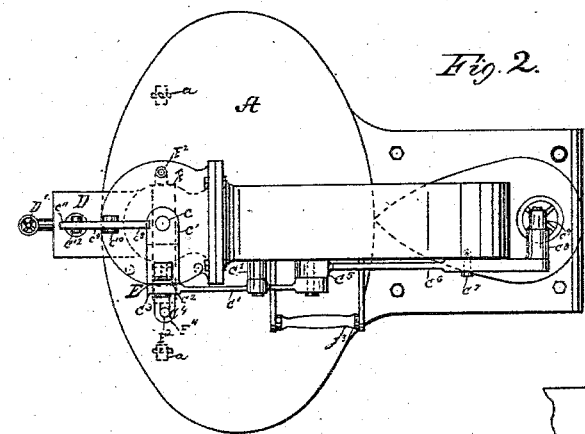
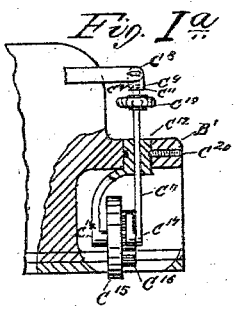
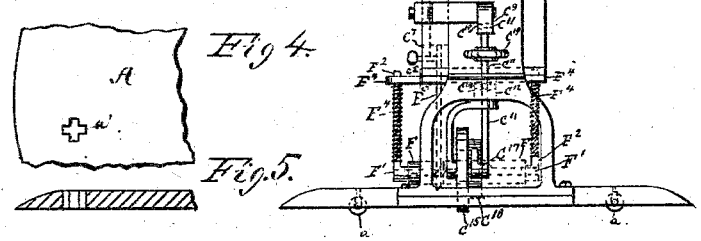
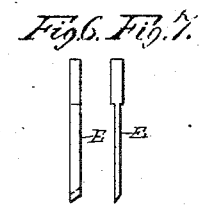
WITNESSES:
Robert Hartmann
George J. Mahlar
INVENTOR
Gabriel J. W. Galster
by his Attorney
W. Colborne Brookes

UNITED STATES PATENT OFFICE.

GABRIEL J. W. GALSTER, OF NEW YORK, N. Y.

APPARATUS FOR CUTTING FORMS FROM A LAYER OR LAYERS OF FIBROUS OR OTHER MATERIAL.

SPECIFICATION forming part of Letters Patent No. 288,049, dated November 6, 1883.

Application filed December 26, 1882. (No model.)

*To all whom it may concern:*

Be it known that I, GABRIEL JOHAN WILHELM GALSTER, a subject of the King of Denmark, residing in New York city, in the county and State of New York, have invented certain new and useful improvements in apparatus for cutting forms or designs from a layer or series of layers of fibrous or other material, of which the following is a specification.

According to my invention I construct a machine or device by means of which I am enabled to cut patterns, forms, or sections from a layer or series of layers of woven, felted, or other fibrous goods or other materials capable of being cut with a knife.

In carrying out my invention I employ a vertically-reciprocating knife guided in a framing, and so controlled that it may traverse any given line or path and cut any desired pattern, form, or section from a layer or series of layers of material, as hereinafter more fully explained. The vertical reciprocating motion of the cutter I prefer to obtain by connecting the said cutter either directly or by means of levers or suitable connections with a steam, hydraulic, atmospheric, or gas cylinder.

The accompanying drawings form part of this specification and illustrate what I consider the best means of carrying out my invention.

Figure 1 is a side view of my improved cutting device, shown operated by means of a steam-cylinder. Fig. 1$^a$ is a detail view representing the propelling apparatus in position to act transversely. Fig. 2 is a plan view of the same. Fig. 3 is a rear view of the apparatus. Fig. 4 is a plan view, and Fig. 5 is a vertical section, of a portion of the bed-plate of the apparatus separately. Fig. 6 is a front view, and Fig. 7 a side view, of the cutter separately.

In each of the views similar letters of reference are employed to indicate corresponding parts wherever they occur.

A is the bed-plate, upon which is supported the main framing B, which is shown constructed somewhat in the form of a sewing-machine arm, and provided at its forward end with a steam-cylinder, C, and a valve-box, D. The cylinder C is provided with a piston, (not shown,) to which is attached a piston-rod, $c$, to the upper end of which is attached an arm, $c'$, extending horizontally from the said piston-rod $c$ and attached to the upper end of a sliding bar or rod, $c^2$, which is supported with capability of vertical movement in bearings $c^3$ $c^4$, formed on or supported by the cylinder C. The bearing $c^4$ is provided with a hinged front piece, $c^5$, secured in position by a screw-nut or other suitable locking device, $c^6$. The lower end of the sliding bar or rod $c^2$ is formed with an enlargement, $c^7$, adapted to receive and support the upper end of a cutter, E, the lower end of which, as shown more clearly by Figs. 6 and 7, is by preference chisel-shaped. As represented by Figs. 1, 2, and 3, the upper surface of the arm $c'$ is adapted to come in contact with the one end, $c^8$, of a lever or arm, $c^9$, pivoted to the upper end of a bracket, $c^{10}$. The opposite end of the lever or arm $c^9$ is provided with a fork or bearing, $c^{11}$, connected with the upper end of a valve-rod, $c^{12}$, actuating a valve (not shown) arranged within the valve-box D.

D' is the inlet and D$^2$ the exhaust pipe, by means of which steam is conducted to and from the cylinder C.

C' is a pivoted arm, supported on a bearing, C$^2$, carried by the framing B, and which at one end is provided with a fork or bearing, C$^3$, engaging with a pin or stud, C$^4$, extending out from the sliding bar or rod $c^2$. The pivoted arm C' at C$^5$ is connected to the end of a pivoted lever, C$^6$, which is mounted on an axis, C$^7$, the outer end of which, C$^8$, is provided with a bearing-piece, C$^9$, formed with a bearing, C$^{10}$, adapted to receive and support the upper end of a bent shaft, C$^{11}$, the straight portion of which works in a bearing, C$^{12}$, mounted in the rear, B', of the main framing B. The bearing C$^{12}$, on its under side, is formed or provided with an arm or bracket, C$^{13}$, supporting, by means of an axle, C$^{14}$, a bearing and driving wheel, C$^{15}$, adapted to support one end of the apparatus, while at the same time it imparts the desired traversing motion thereto.

Upon the axle C$^{14}$, and on the rear face of the bearing and driving wheel C$^{15}$, is formed a ratchet-wheel, C$^{16}$, so formed that a ratchet or pawl, $C^{17}$, can engage therewith for the purpose of imparting a rotary motion to the axle $C^{14}$ and the bearing or driving wheel $C^{15}$. The ratchet or pawl $C^{17}$ is pivoted on one end of a lever, $C^{18}$, which is itself pivoted centrally on the axle $C^{14}$, and at its opposite end is pivoted to the lower end of the bent shaft $C^{11}$.

$C^{19}$ is a hand-wheel affixed on the upper portion of the straight part of the bent shaft $C^{11}$ for the purpose of effecting the rotation of the said shaft $C^{11}$ when desired, the object of such rotation of the shaft $C^{11}$ being to turn the bearing and driving wheel and parts connected therewith around, so as to change the direction of motion of the device.

The bed-plate A on each side of the cylinder C is provided with the pivoted rollers or small bearing-wheels $a$, adapted to support the front end of the apparatus.

A pair of bearing-rollers, F, are arranged one on each side of the cutter E. These bearing-rollers are supported on axes F', supported by rods or standards $F^2$, supported by the under side of the cylinder C, and provided with springs $F^3$, adapted to bear against a cross-piece, $F^4$, carrying the axles F', for the purpose of holding the cloth or material in place while being cut. In the bed-plate A, I, by preference, form a cross-shaped aperture, $a'$, for the passage of the cutter E, the object of the cross-shaped construction of the aperture $a'$ being to allow of the cutter E being turned at right angles when desired, according to whether the machine is required to operate lengthwise or transversely of the cutting-table.

Steam is supplied to the inlet-pipe D' and conducted away from the exhaust-pipe $D^2$ by means of rubber or other suitable pipes or connections, (not shown.)

The operation of the apparatus is as follows: Steam or other desired media being introduced and exhausted or allowed to flow from the cylinder C, an up-and-down motion will be imparted to the cutter E, and at the same time by means of the series of connecting-levers, hereinbefore described, a gradual rotatory motion will be imparted to the supporting and driving wheel $C^{15}$, and the machine will be impelled forward gradually at a regulated speed.

The bed-plate A is curved or sharpened at its front edge to facilitate its passage under the goods. The goods, it will be understood, will be chalked or marked out with patterns in any desired manner, and the apparatus will be guided to the said pattern, or the goods and pattern may be guided to the machine as desired, although in all cases I prefer to guide the machine over the goods and pattern.

On the side of the main framing B, I apply a handle or handles, $j^3$, by means of which I am enabled to guide the cutter E over the work.

The bearing $C^{12}$ is retained correctly in position in the framing B, when desired, by a set-screw, $C^{20}$, provided at its end with a bearing or head adapted to be received into a groove or socket, $C^{21}$, formed in the periphery of the bearing $C^{12}$.

Modifications may be made in my invention. In place of actuating my vertically-reciprocating cutter directly from a steam, hydraulic, atmospheric, or gas cylinder, I can employ intermediate levers or gearing, so arranged that they shall be adapted to control the motion of the cutter, and at the same time allow of the said cutter being traversed in any desired direction to cut a pattern or patterns, a form or forms, or a section or sections from a layer or series of layers of material. I have shown the cutter chisel-shaped on the end. I can, however, with equal facility, employ a double-edged cutter, or a cutter of any desired pattern or design. The operating-handles may be placed in any desired position, or they may be applied and operated by intermediate arms, levers, or supports.

Having thus described my invention, what I claim, and desire to secure by Letters Patent, is—

1. In a machine or device for cutting forms or designs from a layer or series of layers of fibrous or other material, the combination, with a steam or other cylinder operating an external knife-holding rod or bar, a frame, B, and a bed-plate A, mounted on rollers or casters, of an automatic driving device adapted to control the motion of the apparatus to and fro in any direction, substantially as shown and described.

2. In a machine or device for cutting forms or designs from a layer or series of layers of fibrous or other material, the combination, with a steam or other cylinder operating an external knife, a frame, B, and a bed-plate, A, provided with inclined edges, and mounted on rollers or casters, of the spring bearing and retaining rollers F, supported on standards $F^2$, arranged on each side of the cutter, substantially as and for the purpose described.

3. In a machine or device for cutting forms or designs from a layer or series of layers of fibrous or other material, the combination, with a steam or other cylinder operating an external knife-holding rod or bar, a frame, B, and a bed-plate, A, provided with inclined edges, and mounted on rollers or casters, of the spring bearing and retaining rollers F, supported on standards $F^2$, arranged on each side of the cutter, and an automatic guiding and propelling device operated by levers connected with the piston-rod of a steam or other cylinder, substantially as and for the purpose described.

4. The combination, with a device adapted to cut forms or designs from a layer or series of layers of fibrous or other material, of a pivoted shaft supported in a bearing with capability of revolution, and operating a driving and supporting wheel or wheels, substantially as shown and described.

5. The combination, with a device adapted to cut forms or designs from a layer or series of layers of fibrous or other material, of a pivoted shaft and a ratchet-wheel operated by a pawl, and supported on the axle of the driving and supporting wheel of the device, substantially as shown and described.

In witness whereof I have hereunto set my hand this 22d day of December, 1882.

GABRIEL J. W. GALSTER.

Witnesses:
ROBERT HARTMANN,
W. COLBORNE BROOKES.